UNITED STATES PATENT OFFICE.

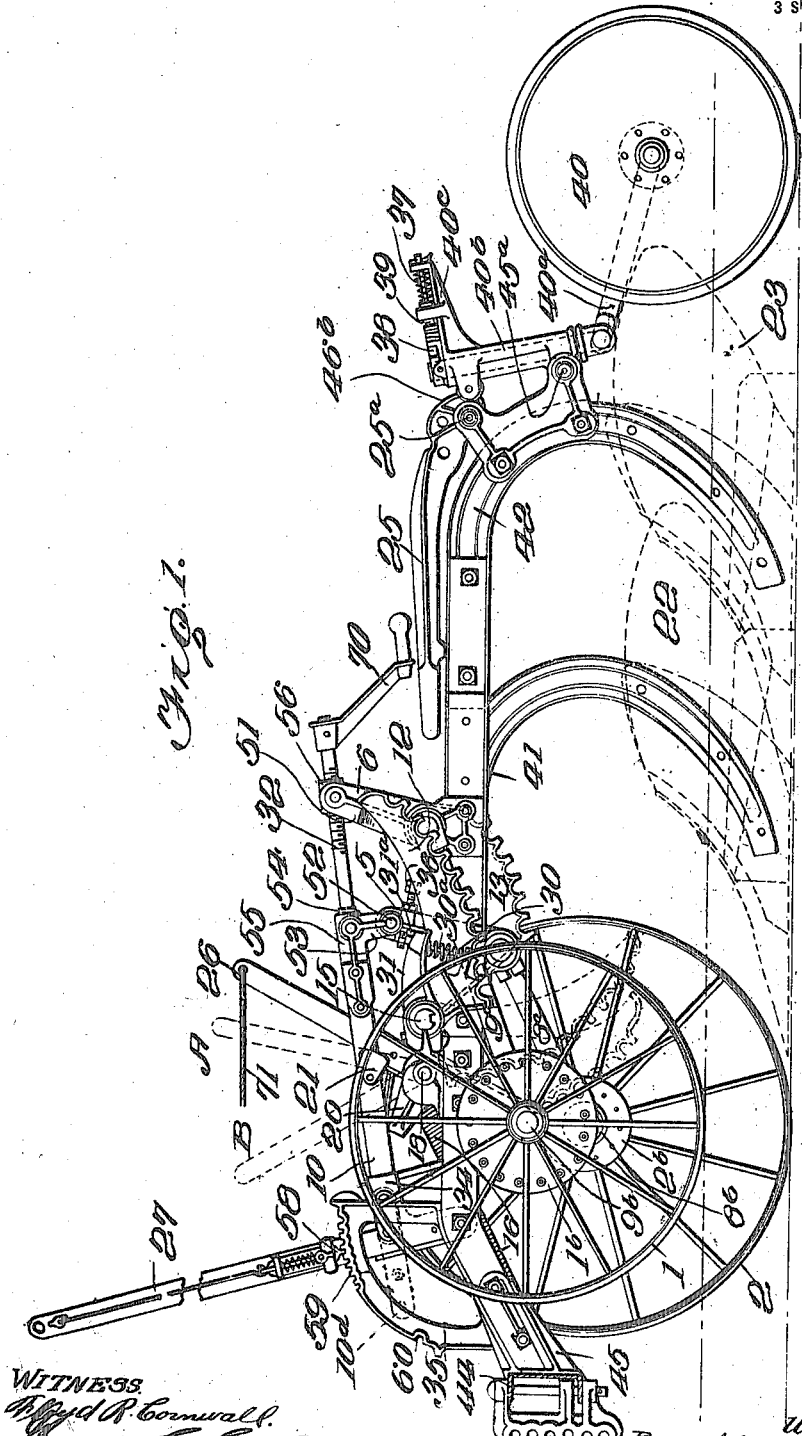

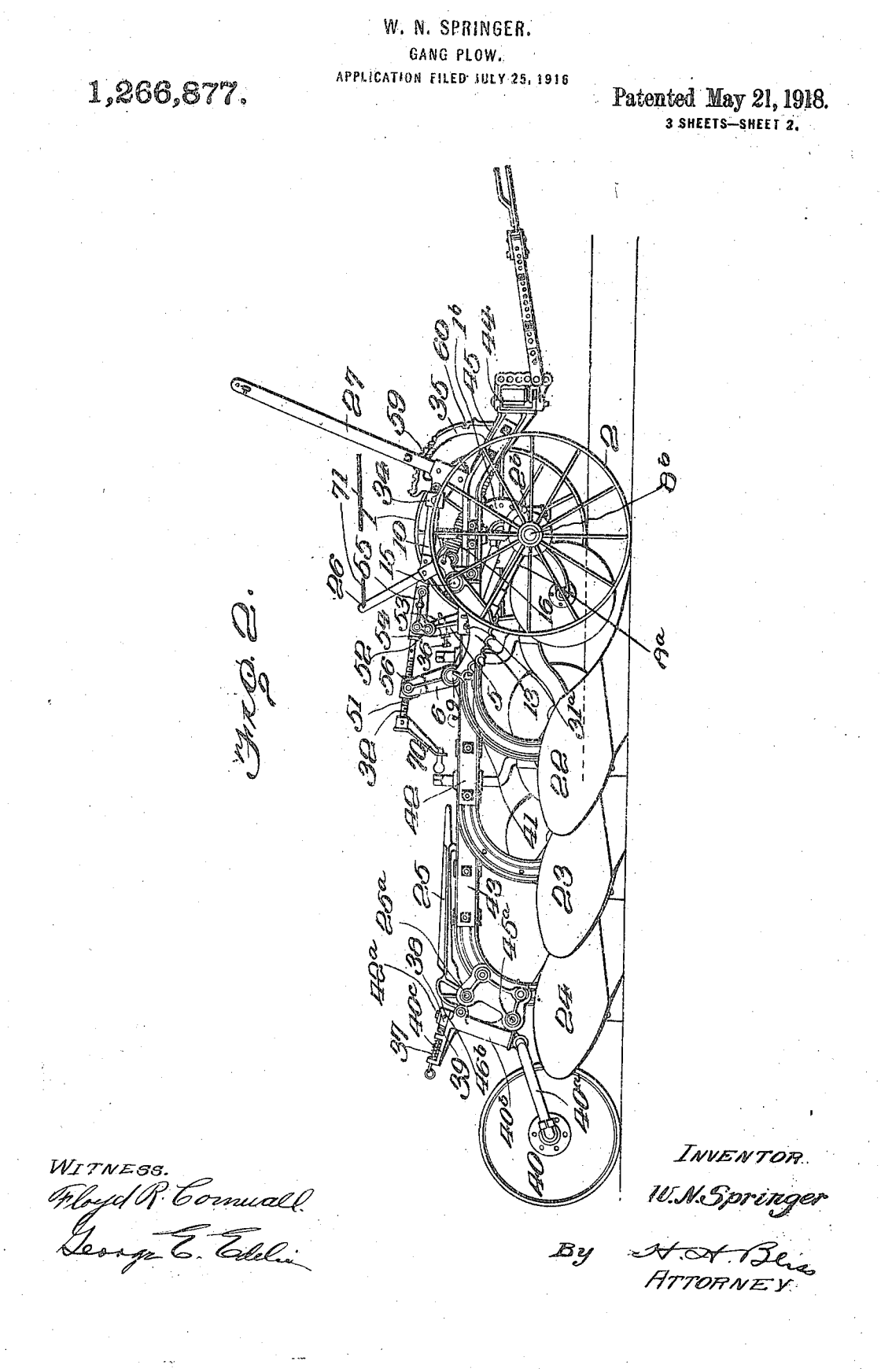

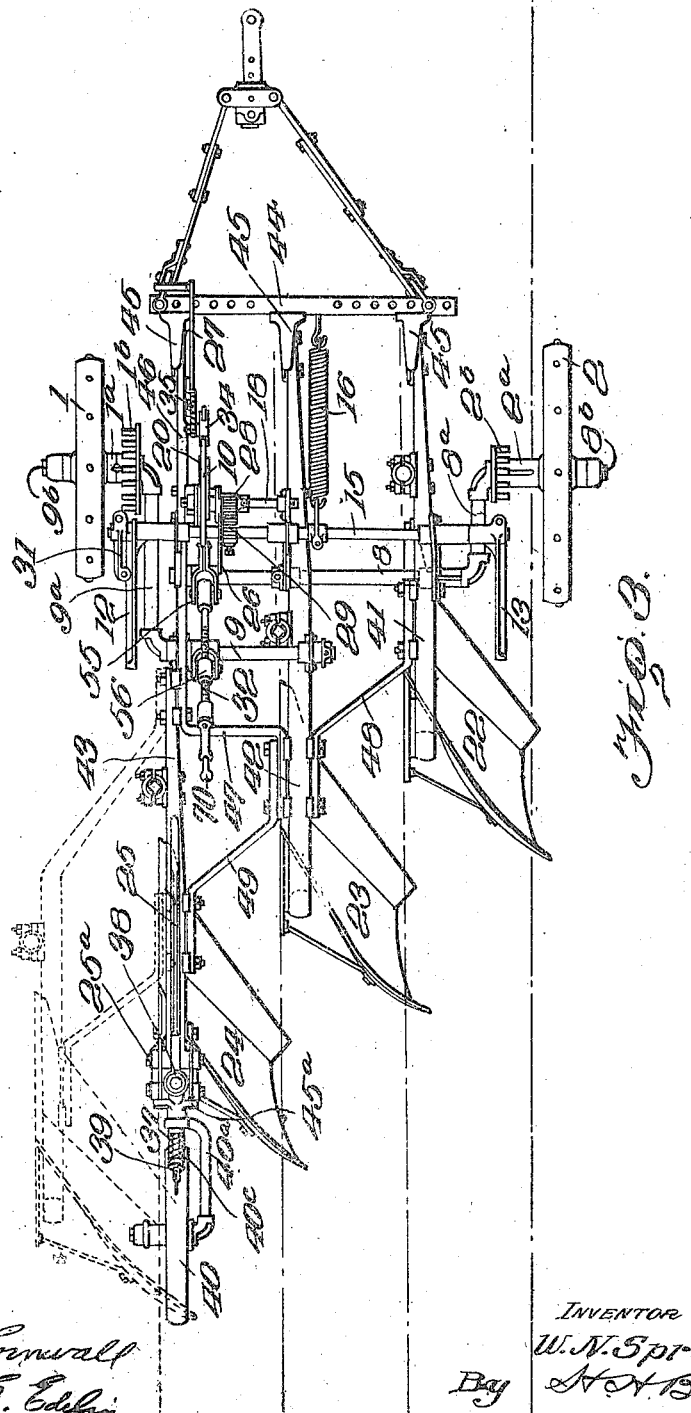

WILLIAM N. SPRINGER, OF PEORIA, ILLINOIS, ASSIGNOR TO OLIVER CHILLED PLOW WORKS, OF SOUTH BEND, INDIANA.

GANG-PLOW.

1,266,877. Specification of Letters Patent. Patented May 21, 1918.

Application filed July 25, 1916. Serial No. 111,212.

*To all whom it may concern:*

Be it known that I, WILLIAM N. SPRINGER, a citizen of the United States, residing at Peoria, in the county of Peoria and State of Illinois, have invented certain new and useful Improvements in Gang-Plows, of which the following is a specification, reference being had therein to the accompanying drawing.

This invention relates to improvements in gang plows, particularly those that are constructed and arranged to be drawn by tractors. The object is to provide a plow of this sort with improved means for lifting, automatically, the plows from their furrows by means of power transmitted from the wheels which support the plow frame. The invention also relates to improvements by which, after the front part of the plow system has been elevated, the rear part can be readily brought to such position that the bodies will all be in planes parallel to the ground surface and can there be advantageously supported for transportation.

Differently speeded frame-lifting mechanisms are combined with the frame at its front end. The power devices at the initial end of each of the trains of lifting mechanism are differently speeded ground wheels. I have also devised improvements in the details of the lifting devices themselves.

Of the drawings—

Figure 1 is an elevation from the landside of a plow embodying my improvements;

Fig. 2 is an elevation from the furrow side of a similar plow with three bodies;

Fig. 3 is a top plan view of Fig. 2.

In Fig. 1 the plow is shown as having two bodies; but ordinarily a larger number is employed.

In Figs. 2 and 3 there are shown three bodies 22, 23 and 24 and three beams 41, 42 and 43. The three beams, together with some supplemental bars, are so arranged as to make a rigid frame. The plow 22 on the furrow side has a short beam 41. This and the longer beam 42 of the intermediate plow are turned downward at the front ends and are rigidly secured to a cross angle bar 44 by means of brackets 45. At the landside there is a supplemental bar 46 secured by a bracket 45 to the front cross bar 44. It extends back to a transverse line near the rear end of the intermediate beam 42 and is there bent inward to provide an offset 47, which is firmly secured to the intermediate beam 42. The landside beam 43 is rigidly secured to the longitudinal part of the bar 46.

The parts thus rigidly secured together provide, as aforesaid, a frame having rigidly connected parts. 48 is a brace rigidly fastened to the beams 41 and 42. 49 is a brace rigidly secured to the beams 42 and 43.

The forward portion of this frame is supported upon the front landside wheel 1 and the front furrow wheel 2. The furrow wheel 2 has a diameter considerably larger than that of the land wheel 1 to compensate for the former rolling in the furrow, with the result of holding the frame level when the plow is at work.

The furrow wheel 2 is connected to the frame by the shaft 8, having a crank arm 8$^a$ and a wheel spindle 8$^b$. The shaft part 8 is mounted in bearings on the undersides of the beams 41 and 42 and the bar 46.

The landside wheel is carried by a shaft 9, having a crank arm 9$^a$ and a wheel spindle 9$^b$. The furrow wheel has a sleeve 2$^a$, at the inner end of which there is a gear wheel 2$^b$, preferably of the form of a lantern pinion. The land wheel 1 has a sleeve 1$^a$, at the inner end of which there is a lantern wheel 1$^b$. The diameters of the pinions 1$^b$ and 2$^b$ are inversely as the diameters of the wheels 1 and 2; that is to say, the larger wheel 2 has a relatively small pinion, while the smaller land wheel 1 has a relatively larger pinion. The cranks 8$^a$ and 9$^a$ on the shafts 8 and 9, respectively, are inclined forward and downward, and it will be seen that if these cranks and their spindles, together with the wheels 1 and 2, be rocked backward around the axes of the shaft parts 8 and 9, the front end of the plow frame will be lifted. To effect this lifting by hand, I use the following devices. The shaft 8 has a crank 5 rigidly secured thereto, and the shaft 9 has a crank 6 similarly attached to it. To operate these cranks, use is made of a longitudinally arranged bar 10. It is flexibly connected to the crank arm 5 on the shaft 8 by a pivot at 52, the bar 10 being forked at its rear end, and the arms of the forks having downwardly extending lugs 53 to carry the pivot 52. The bar 10 is connected to the crank 6 of the shaft 9 by the rod 32. The front end of this rod is rotatably seated in a mounting 54, having trunnion pivot connection with the fork 55 on the rod 32. 56 is a trunnioned nut on the rod 32, the latter being threaded for a portion of its length to engage with this nut. The trunnion pivots of the nut are connected with the crank arm 6. The front end of the bar 10 is pivotally connected to the hand lever 27, which is pivotally mounted on the frame. The lever carries a manually controlled detent 58, which engages with the teeth on the segment 59, carried by bar 35 or can be seated in the socket at 60.

When the operator desires to adjust the depth of the plowing, he grasps the lever 27 and releases the detent 58, and he can then exert forward draft on the bar 10; and this, in turn, will, through the crank arms 5 and 6, rock the shafts 8 and 9 and cause the swinging of the wheels and the cranks $8^a$, $9^a$, upward or downward relatively to the frame; that is to say, the frame will be lowered or raised. He then, after adjusting the frame and the plow bodies relatively to the wheels, resets the detent 58 in segment teeth at 59 and holds the parts at the points set for desired depth.

In case he desires to vary the relative positions of the wheels 1 and 2, he utilizes the threaded rod 32 and the nut 56 by means of the hand crank 70 at the rear end of the rod. By turning this, he will rock the wheel 1 and its crank $9^a$ up or down, bringing its axis toward or from the axis of the wheel 2, as required; and correspondingly effecting the leveling of the frame, and also adjusting the tilt of the plow beams around longitudinal axes. That is to say, he can tilt them to the right or to the left, as demanded.

The bar 10 is fitted in, and adapted to slide through a loop or tubular block 34 attached to the lever 27. The rod slides in a forward direction through the block indefinitely, but is stopped against backward movement. This loose or sliding connection between the lever and the bar provides for the lifting of the front end of the frame, even when the lever 27 is set.

To thus lift the frame, power is applied to the wheels and their crank arms 8 and 9 for forcing them downward. The power for this is derived from the wheels, themselves, through the medium of the gears $1^b$ and $2^b$, and through rack bars 12 and 13. The rack bars constitute optionally adjustable lifting elements carried by the frame. The rack bar 13 is rigidly secured to a cross shaft 15 mounted on the top of the frame. The rack 12 is secured to the other end of the same shaft, but is adapted to yield within limits. An arm 31 is secured to the shaft 15, and by the side of this is loosely pivoted the rack 13. Parts of the arm and parts of the rack are in the same planes transverse of the shaft 15; that is to say, part of one overlaps part of the other. Between the overlapping parts a compressible spring 30 is placed, which is held in position by a rod or long bolt $30^a$, this bolt passing through a flange on the rack 12 and through an aperture in the arm 31. By means of the nut $31^a$ an adjustment can be effected between the rack and the arm.

These rack bars 12 and 13 are, respectively, in the longitudinal planes of the gears $1^b$ and $2^b$.

The operator can lower the racks at will as follows. On the shaft 15 there is a gear wheel or segment 29, and at 28 there is an intermeshing gear or segment secured to a short cross shaft 18 mounted in bracket ears on the frame. The shaft 18 is provided with a lever arm or crank arm 26 which extends upward; to this a cord or rope 71 is attached which extends forward to the platform of the tractor. When the operator wishes to lower the racks and to lift the front end of the frame by power, he pulls forward on the crank lever 26, rocking the shaft 18, and this, in turn, rocks the shaft 15 reversely, and moves the racks 12 and 13 downward toward their gear wheels, respectively. The flexible or yielding movement allowed for the rack 12 insures that the racks can be brought freely into intermesh with the gear wheels. By means of the adjusting device at 36 engaging with the crank arm 5, the depth to which the teeth of the gearing will engage with the rack is controlled.

After the racks have lifted the plows to the desired limit, they are held there by means of the lug 21 fastened to the bar 10, this bar moving forward as the plows rise and finally bringing them into engagement with the latch arm 20 on shaft 18. After the engagement of these parts 20 and 21 occurs, the parts are held rigidly in such position as to maintain the front part of the frame and the plow bodies in elevated positions.

A spring 16 tends to return the shaft 15 and all of the other parts connected therewith to those positions occupied at the opposite limits of their movements; that is to say, tends to draw the rack bars 12 and 13 away from their gear wheels and to hold them elevated.

The dotted lines at B in Fig. 1 show the position to which the operator draws the crank lever 26 when he wishes to lower the racks and lift the plows.

When he desires to again lower the plows, he merely gives a quick sharp movement to the crank arm 26, drawing it to the position indicated by the dotted lines at A. This is sufficient to disengage the latch arm 20 and the catch 21, after which the bar 10 is free to slide backward, and the wheels, together with their cranks, are also free to swing up. Or, in other words, the frame is free to swing downward until the stop $10^d$ at the front end of the bar 10 engages with the block or box at 34.

The hand lever 27 can also be used to rock the wheels and their cranks downward and lift the frame upward. This is frequently necessary when it is desired to raise the plows for a brief period. And after the plows have been lifted by the racks and gear, it is advantageous to supplement the stop action of latch arm 20 and the catch 21 by means of a positive holding device, and this is provided in the notch at 60 in the segment bar 35 and the detent on the lever, for the operator can carry the lever forward and downward until the detent engages with the notch at 60, and, thereafter, the front end of the frame will be positively locked in its uppermost position.

As soon as the front end of the frame begins to rise, either because of power applied by the operator's hand through the long lever, or by the wheels, the points of the plow bodies begin to correspondingly rise upward, and the bottom lines of the plow bodies are inclined forward and upward. This results instantly, with a tendency for the plows to slide out of the ground to the surface, and this sled-runner-like action in an upper direction of the plow bodies greatly increases the self-lifting action of the mechanism, and the racks and gear wheels are largely relieved.

After the plow bodies have been brought to the surface, they will, however, tend to have the forward body high and the rearmost body low, with its heel near the surface. To bring the entire series of bodies to a common level, I so mount the rear furrow wheel that it shall not only serve while in the furrow as an abutment and brace to maintain the proper furrow lines, but also so that it can be utilized for lifting. This wheel is indicated at 40, having its axle mounted in an arm 40$^a$, which carries a spindle 42$^a$ that is mounted in a tubular bracket 40$^b$. At the upper end of the spindle above the bracket there is a notched segment 38 with which engages a catch 39 held in working position by a spring 37. By these devices the spindle and furrow wheel can be released and turned to any desired position and then reset and firmly locked or released for castering.

The tube or bearing 40$^b$ is joined to the rear end of the plow frame by a horizontal pivot 45$^a$ in a plane relatively low and having the main part of the bracket tube extending upward therefrom. When the plows are at work, the bracket tube is inclined forward. When it is moved back at its upper end, or brought to the vertical, it throws the furrow wheel relatively down, and the rear end of the frame and the rearmost plows relatively up. This is done by means of a lever 25 which is pivoted at 25$^a$ on the plow frame and carries a cam 46$^b$, which bears against the upper end of the spindle tube.

After the front end of the frame and the front plow bodies have been lifted and the plow has slid to the surface of the ground, the lever 25 is utilized to cause its cam to force the spindle bracket 40$^b$ backward, which results in relatively lowering the furrow wheel and lifting the rear frame and plows. These parts just described are so shaped and related that when the cam has reached the limit of its operation, it is locked in position, and the plows are all held in elevated planes with their heels and lower parts free from the surface.

What I claim is:

1. The combination with a plow frame, a wheel, and a crank axle mounted on said plow frame and having a part of its crank entering the hub of said wheel, of a gear carried by the wheel, a pivoted rack mounted on the frame in advance of the mounting of the crank axle, and means for moving said rack into mesh with said gear rearwardly thereof.

2. The combination with a plow frame, a wheel, and a crank axle mounted on said plow frame and having a part on its crank entering the hub of said wheel, of a gear carried by the wheel, a rack pivoted on the plow frame in a plane above the hub of the wheel and between said hub and the mounting of the crank axle, and means for disposing said rack between the crank axle mounting and said gear and in mesh with the latter behind the same.

3. The combination with a plow frame, crank axles and wheels having mountings on the cranks of said axles, of gears carried by said wheels, racks pivotally mounted on the frame in advance of the crank axle mountings and movable into mesh with said gears rearwardly of their axes.

4. The combination with a plow frame, a crank axle mounted thereon and having a forwardly projecting crank arm and a wheel having a mounting on said crank arm, of a gear carried by said wheel, and a rack pivoted to the frame in advance of the mounting of said crank axle and movable behind said gear and into mesh therewith.

5. The combination with a plow frame, a crank axle mounted thereon, and a wheel having a mounting on the crank of said axle, of a gear carried by the wheel, a rack curved concentric to the mounting of said crank axle on the plow frame, said rack being pivotally mounted at its upper end on the frame rearwardly of the pitch line of its teeth and forwardly of the mounting of the crank axle.

In testimony whereof I affix my signature in presence of two witnesses.

WILLIAM N. SPRINGER.

Witnesses:
W. E. THOMPSON,
H. HANNUM.